(12) United States Patent
Liu et al.

(10) Patent No.: US 9,565,037 B1
(45) Date of Patent: Feb. 7, 2017

(54) ADAPTIVE SERDES RECEIVER

(71) Applicant: Intel Corporation, Santa Clara, CA (US)

(72) Inventors: Zao Liu, Santa Clara, CA (US); Todd L. Bermensolo, Lacey, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/977,122

(22) Filed: Dec. 21, 2015

(51) Int. Cl.
*H04L 27/01* (2006.01)
*H04L 25/03* (2006.01)

(52) U.S. Cl.
CPC .............................. *H04L 25/03057* (2013.01)

(58) Field of Classification Search
CPC ............. H04B 1/10; H04B 1/76; H04B 3/14; H04B 3/141; H04B 3/143; H04B 3/144; H04B 3/145; H04B 3/146; H04B 3/147; H04B 3/148; H04B 3/23; H04B 3/235; H04B 10/60; H04B 10/69; H04B 10/697; H04B 10/6971; H04L 25/03267; H04L 2025/03433; H04L 2025/0349; H04L 2025/03496; H04L 2025/03503; H04L 27/01; H04L 27/2647
USPC ............... 375/229, 230, 231, 232, 233, 234, 316,375/340, 346
See application file for complete search history.

(56) References Cited

U.S. PATENT DOCUMENTS

| | | | | |
|---|---|---|---|---|
| 7,346,012 | B2 * | 3/2008 | Stopler | H04B 3/23 370/286 |
| 7,940,839 | B2 * | 5/2011 | Lapointe | H04B 3/04 375/229 |
| 8,942,334 | B1 * | 1/2015 | Zortea | H04L 7/042 375/355 |
| 9,215,107 | B1 * | 12/2015 | De Bernardinis | H04L 25/03057 |
| 2007/0258517 | A1 * | 11/2007 | Rollings | H04L 25/03057 375/233 |
| 2008/0063041 | A1 * | 3/2008 | Galperin | H04L 25/0307 375/233 |
| 2008/0232453 | A1 * | 9/2008 | Cohen | H04L 25/03057 375/232 |
| 2014/0029661 | A1 * | 1/2014 | Takaoka | H04L 25/03159 375/232 |

* cited by examiner

*Primary Examiner* — Siu Lee
(74) *Attorney, Agent, or Firm* — Grossman, Tucker, Perreault & Pfleger, PLLC

(57) ABSTRACT

One embodiment provides an apparatus. The apparatus includes a feedforward equalizer (FFE), an FFE data slicer and an FFE least mean square (LMS) module. The FFE data slicer is to threshold detect a sample of a received analog training signal, a result of the threshold detecting corresponding to an input signal digital decision. The FFE LMS module is to determine a plurality of FFE coefficients based, at least in part, on an output of the FFE data slicer and based, at least in part, on a mean square error corresponding to a difference between an equalized sample and a reference.

19 Claims, 4 Drawing Sheets

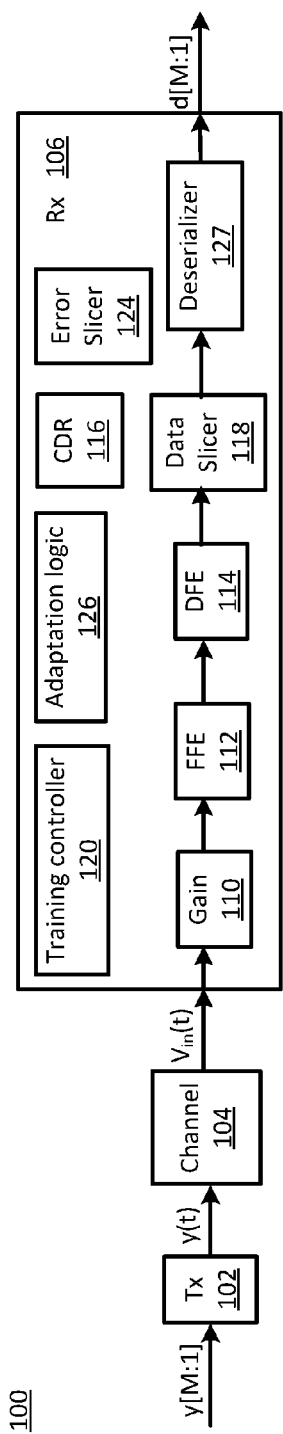

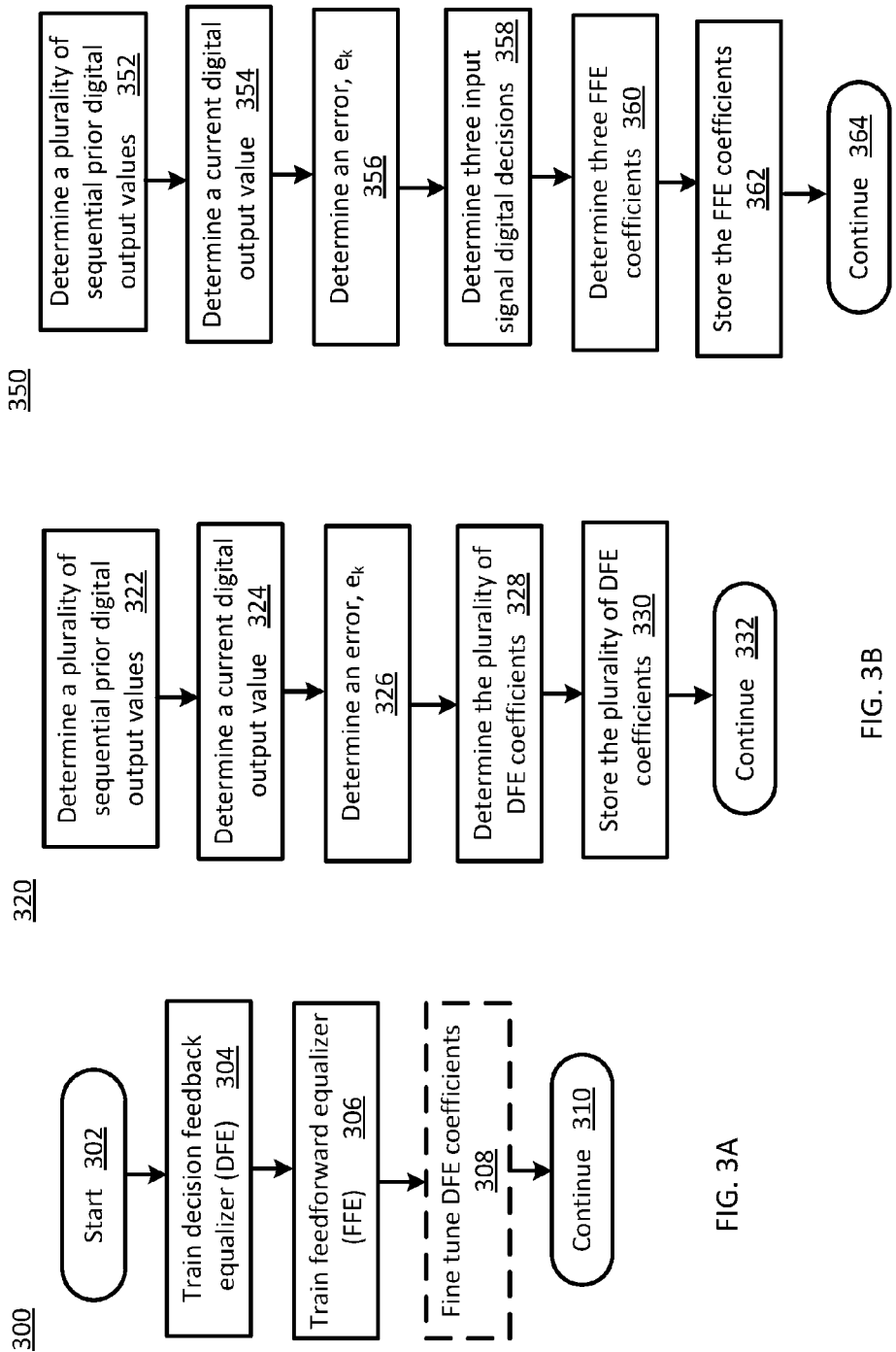

600

700

ADAPTIVE SERDES RECEIVER

FIELD

The present disclosure relates to a receiver, in particular to, an adaptive SerDes (serializer/deserializer) receiver.

BACKGROUND

An electronic communication system typically includes a transmitter and a receiver coupled by a communication channel. In digital communications, digital data that includes a plurality of binary digits, i.e., bits, may be serialized and converted to an analog signal for transmission. The transmitted analog signal is carried by the communication channel to the receiver. The received analog signal may then be digitized (e.g., "sliced") to recover received bits. The recovered bits may then be deserialized and the plurality of recovered bits may be output from the receiver.

Non-ideal characteristics of the communication channel may distort the analog signal resulting in a bit error rate (BER) at the receiver. A bit error means that a value of a recovered bit is not the same as the value of the corresponding transmitted bit. For example, non-ideal channel characteristics include a finite bandwidth, a frequency dependent attenuation in the pass band and frequency dependent propagation velocity. The respective magnitude of each non-ideal channel characteristic is specific to a communication channel. In order to manage and/or reduce a bit error rate, the receiver may be adapted to an associated channel upon deployment.

BRIEF DESCRIPTION OF DRAWINGS

Features and advantages of the claimed subject matter will be apparent from the following detailed description of embodiments consistent therewith, which description should be considered with reference to the accompanying drawings, wherein:

FIG. 1 illustrates a system block diagram of a communication system that includes an adaptive SerDes (Serializer/Deserializer) receiver consistent with several embodiments of the present disclosure;

FIG. 2 illustrates a functional block diagram of one example of the adaptive SerDes receiver of FIG. 1;

FIG. 3A is a flowchart of adaptive SerDes receiver training operations according to various embodiments of the present disclosure;

FIG. 3B is a flowchart of DFE coefficient training operations according to various embodiments of the present disclosure;

FIG. 3C is a flowchart of FFE coefficient training operations according to various embodiments of the present disclosure;

Figure 4:
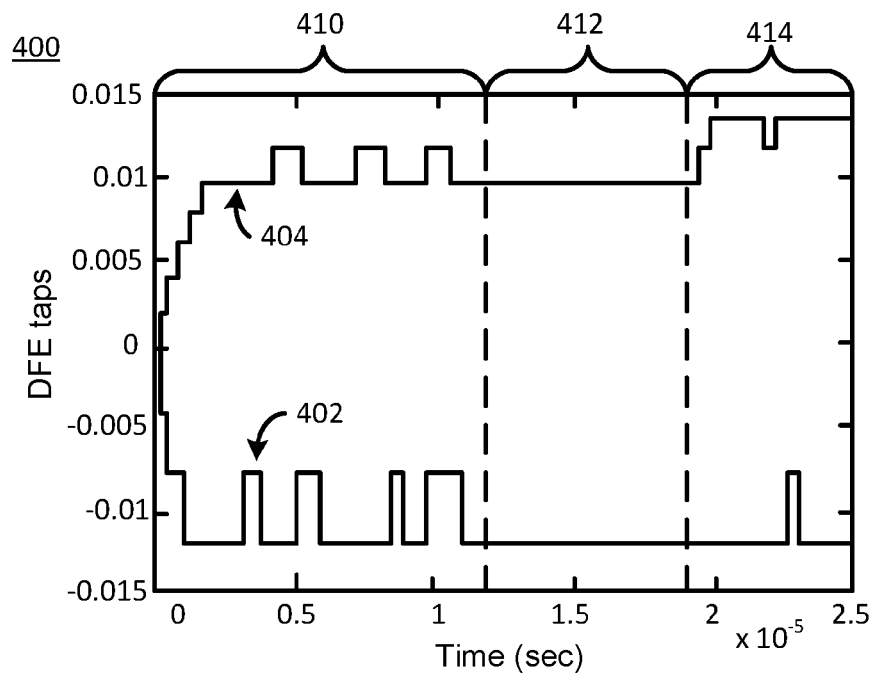
FIG. 4 is a plot of decision feedback equalizer tap value simulation results for one example adaptive SerDes receiver model.

Although the following Detailed Description will proceed with reference being made to illustrative embodiments, many alternatives, modifications, and variations thereof will be apparent to those skilled in the art.

DETAILED DESCRIPTION

In digital communications, high-speed receivers with data rates on the order of ten gigabits per second (Gbps) utilize adaptive equalization techniques to reduce a bit error rate (BER). Equalization techniques utilized in receivers include decision feedback equalization (DFE) and feedforward equalization (FFE). Decision feedback equalization utilizes weighted prior decisions, i.e., prior digital outputs, in deciding whether a current digital output, i.e., a current bit, is a zero or a one. For example, a voltage of an equalized sample, e.g., a slicer output, greater than a threshold may be determined to be a one (or a zero) and an equalized sample value less than the threshold may be determined to be a zero (or a one). Feedforward equalization utilizes a weighted sum of three sequential samples (pre-cursor, main cursor, post-cursor) of the received analog signal to facilitate determining a value (zero or one) of the middle sample (main cursor).

An adaptive receiver may be considered a real time linear classifier configured to determine whether a sampled received bit (i.e., a symbol) corresponds to a zero or a one. Equalization coefficients (i.e., weights) may be determined via training (i.e., adaptation) that is configured to minimize a cost function, i.e., an error function. The training is configured to adapt the receiver to the communication system that includes the communication channel coupled to the receiver. The training is configured to account for non-ideal channel characteristics. Adaptation operations, i.e., training, may be performed at initial deployment and intermittently and/or periodically thereafter.

Generally, this disclosure relates to an adaptive SerDes receiver. An apparatus, method and system are configured to determine a plurality of DFE coefficients and a plurality of FFE coefficients utilizing a least mean square (LMS) error technique. The apparatus, method and system are configured to implement a gradient descent technique to iteratively reduce the LMS error to a minimum and, thus, to determine the equalization coefficients.

The gradient descent technique related to determining the DFE coefficients utilizes an output of a DFE data slicer. The gradient descent technique related to determining the FFE coefficients utilizes an output of an FFE data slicer. A data slicer is configured to threshold detect, i.e., to determine whether an input sample is greater than or less than or equal to a threshold, and to provide a corresponding output (+1 or −1), i.e., a digital decision. The DFE data slicer is configured to receive a sample of an output of a DFE. The output of the DFE data slicer corresponds to an output digital decision, i.e., a digital output of the adaptive SerDes receiver. The FFE data slicer is configured to receive a sample of an analog input signal. The output of the FFE data slicer corresponds to an input signal digital decision. Utilizing the input signal digital decision to determine the FFE coefficients may facilitate relatively better adaptation of the FFE coefficients compared to techniques that utilize the output of the DFE slicer for both DFE and FFE.

The DFE coefficients and FFE coefficients may be determined during training operations when a training input signal including a training bit sequence is input to the channel coupled to the adaptive SerDes receiver. The determined DFE and FFE coefficients may then be utilized during tracking operations of the adaptive SerDes receiver to mitigate non-ideal channel characteristics and, thus, reduce a bit error rate associated with recovering digital data from a received analog information (i.e., data) signal.

FIG. 1 illustrates a system block diagram of a communication system 100 that includes an adaptive SerDes (Serializer/Deserializer) receiver (Rx) 106 consistent with several embodiments of the present disclosure. Communication system 100 further includes a transmitter (Tx) 102 and a communication channel 104. Channel 104 is configured to couple Tx 102 to Rx 106. For example, channel 104 may include, but is not limited to, a wire, a printed circuit board trace, connector(s), cable(s), air, a plurality of wires (e.g., one or more twisted pairs, a coaxial cable, etc.), etc. Non-ideal channel characteristics associated with channel 104 include a finite bandwidth, a frequency dependent attenuation in the pass band and/or a frequency dependent propagation velocity. As a result, a transmitted analog signal, e.g., a sequence of analog pulses, may be distorted by channel 104 during transmission. Noise may also be introduced by Tx 102, channel 104 and/or Rx 106. The adaptive SerDes receiver 106 may be adapted (i.e., trained) to the channel 104 to facilitate recovery of transmitted data from the received analog signal, as described herein.

Transmitter 102 is configured to receive a plurality of M-bit digital data values, y[M:1], where M bits are received in parallel. Transmitter 102 is configured to serialize the received bits, $y_k$, k=1, . . . , M, convert the serialized bits to an analog signal and to transmit the analog signal, y(t), via channel 104 to receiver 106. The received signal, $V_{in}(t)$, is related to the transmitted analog signal, y(t). Functions of receiver 106 include recovering the transmitted bitstream, deserializing the recovered bitstream and outputting the recovered data, i.e., digital output, d[M:1], where M bits may be output in parallel. For example, M may be 32 bits. In other examples, M may be greater than 32 bits or less than 32 bits.

Receiver 106 (and system 100) operating modes include a training mode and a tracking mode. Receiver 106 in the training mode is configured to determine FFE coefficients and DFE coefficients, as described herein. Receiver 106 in the tracking mode is configured to utilize the FFE coefficients and the DFE coefficients determined during training to mitigate effects of non-ideal channel characteristics and to facilitate recovery of the transmitted data from the received analog signal.

Receiver 106 includes a gain stage 110, an FFE 112, a DFE 114, clock and data recovery (CDR) module 116, a data slicer 118 and deserializer 127. Receiver 106 may include a training controller 120, adaptation logic 126 and an error slicer 124. Gain stage 110 is configured to amplify the received analog signal, $V_{in}(t)$. FFE 112 and DFE 114 are configured to provide feedforward equalization and decision feedback equalization, respectively. CDR 116 is configured to receive output signals from data slicer 118 and error slicer 124, to perform phase detection and symbol timing functions on the received signals and to adjust a frequency of the CDR 116 so that "lock" may be obtained and maintained. An output of the CDR 116, i.e., a clock signal, may thus be provided to slicers 118, 124.

The data slicer 118 and error slicer 124 are configured to threshold detect an input sample and to output a digital decision, e.g., +1 or −1, depending on whether the input sample is greater than or equal to or less than a threshold. For example, data slicer 118 and/or error slicer 124 may include comparators configured to provide a logic high (or low) output when an input is greater than a reference input, e.g., zero volts, and a logic low (or high) output when the input is less than the reference input. In this example, logic low may correspond to −1 and logic high may correspond to +1. Data slicer 118 is configured to receive an amplified and equalized analog input signal (i.e., an output of DFE 114) and to provide output digital decisions, $d_k$, . . . , $d_{k-N}$, where $d_k$ corresponds to a $k^{th}$ bit in a bit stream and N corresponds to a number of DFE taps, as described herein. Data slicer 118 may be configured to capture a sample of the output of DFE 114 in response to a clock signal from CDR 116 and to provide a corresponding digital decision based on the captured sample. Thus, the subscript k may correspond to a sample index and corresponds to a bit index. The output digital decisions correspond to digital output of Rx 106.

Thus, during operation in the tracking mode, the parallel digital input data y[M:1] may be provided to Tx 102. Tx 102 is configured to generate a serialized bit stream, $y_k$, k=M, and transmit a corresponding analog signal, y(t) to Rx 106 via channel 104. A corresponding analog input signal, $V_{in}(t)$, may then be received by Rx 106. The analog input signal $V_{in}(t)$ is related to y(t). In other words, $V_{in}(t)$ may correspond to y(t) filtered (e.g., attenuated) by channel 104 and its associated non-ideal channel characteristics. The received analog input signal $V_{in}(t)$ may be amplified by gain stage 110, equalized by FFE 112 and equalized by DFE 114. The result (an equalized analog signal related to y(t)) may be input to data slicer 118. An output of data slicer 118, i.e., sequence of output digital decisions, $d_k$, M, may then be processed by deserializer 127 to produce a recovered binary sequence, d[M:1]. Without error, d[M:1] may then correspond to y[M:1].

Training controller 120, adaptation logic 126 and error slicer 124 are configured to be active during training operations, as will be described in more detail below. Training controller 120 is configured to manage training operations. Adaptation logic 126 is configured to perform operations related to adapting Rx 106 to channel 104. In other words, adaptation logic 126 is configured to facilitate determining DFE coefficients and FFE coefficients, as described herein.

During operation in the training mode, $y_k$ is a $k^{th}$ bit in a known bit sequence, the known bit sequence selected to facilitate training. For example, the known bit sequence may correspond to at least a portion of a pseudorandom binary sequence (PRBS). The PRBS may be selected to ensure that $V_{in}(t)$ includes effects of frequency-dependent non-ideal channel 104 characteristics that may be experienced by an analog information signal. Similar to operation in the tracking mode, Tx 102 is configured to generate and transmit an analog signal, y(t), to Rx 106 via channel 104 that includes the known bit sequence. The corresponding analog input signal, $V_{in}(t)$, may then be received by Rx 106. Thus, in training mode as well as in tracking mode, $V_{in}(t)$ corresponds to y(t) "filtered" by channel 104.

The training is configured to determine FFE coefficients and DFE coefficients. The determined coefficients may then be utilized during normal operation to mitigate distortion of the transmitted signal related to the non-ideal channel characteristics and to thus improve, i.e., reduce, a related bit error rate (BER). The DFE coefficients and the FFE coefficients may be determined during respective portions of a training interval. For example, the DFE coefficients may be determined first and the FFE coefficients may then be determined second. The FFE coefficients may be maintained constant during determination of DFE coefficients and the DFE coefficients may be maintained constant during determination of the FFE coefficients. In some embodiments, the DFE coefficients may be fine-tuned, i.e., refined, following determination of the FFE coefficients. In other words, after determination of the FFE coefficients, training directed to DFE coefficients may be repeated and the DFE coefficients updated. Changes to the FFE coefficients as a result of FFE training may thus be accommodated.

Mathematically, the training operations configured to determine the FFE coefficients and the DFE coefficients correspond to minimizing a cost function. The cost function is related to a difference, i.e., an error, between a determined digital output related to the analog input signal and a reference. In other words, during training the adaptive SerDes receiver is configured to adjust the DFE coefficients and the FFE coefficients to minimize a difference between an equalized sample, i.e., the determined digital output, and the reference.

Mathematically, the cost function corresponds to a regression relating the sampled analog input, the FFE coefficients, the DFE coefficients, the determined digital output and the reference. Thus, the cost function may be written as:

$$e_k^2 = \left[\sum_{m=0}^{2} c_m G V_{in,k-m} + \sum_{i=1}^{N} x_i d_{k-i} - d_k V_r\right]^2 \quad (1)$$

where $e_k^2$ corresponds to a squared error associated with a $k^{th}$ sample of analog input signal, i.e., voltage $V_{in}(t)$. $c_m$ is an FFE coefficient (m=0, 1, 2). m corresponds to an index for FFE coefficients, $c_m$, and also corresponds to a number of associated delay intervals. In other words, m=0 corresponds to pre-cursor, m=1 to main cursor and m=2 to post-cursor input samples. G is a gain factor of a variable gain amplifier (VGA), e.g., gain stage 110. $V_{in,k-m}$ is the $k^{th}$ sample of analog input voltage, $V_{in}(t)$, delayed by m delay intervals. $x_i$ is a DFE coefficient (i=1, 2, . . . , N). N corresponds to a number of DFE taps input to a DFE module, as described herein. $d_k$ is the $k^{th}$ sample (i.e., bit) of the DFE data slicer, i.e., output of the DFE data slicer. $V_r$ corresponds to a reference voltage utilized by error slicer.

The first term on the right side of the equal sign in Equation (Eqn.) 1 corresponds to operation of a feedforward equalizer, e.g., FFE 112. The second term on the right side of the equal sign of Eqn. 1 corresponds to operation of a decision feedback equalizer, e.g., DFE 114. The sum of the first and second term may then correspond to an input to a data and/or error slicer, e.g., data slicer 118 and/or error slicer 124. In other words, the input to the data and/or error slicer(s) 118 and/or 124 includes effects of both feedforward equalization and decision feedback equalization. Eqn. 2 corresponds to the input to the data and/or error slicer(s) 118 and/or 124, $V_{slicerIn,k}$.

$$V_{slicerIn,k} = \sum_{m=0}^{2} c_m G V_{in,k-m} + \sum_{i=1}^{N} x_i d_{k-i} \quad (2)$$

The factor, $d_k$, in the third term on the right side of the equal sign in Eqn. 1, is a digital output of, e.g., data slicer 118, i.e., the output digital decision. A value of $d_k$ is related to a value of $V_{slicerIn,k}$, i.e., a sample of the output of DFE 114. The relationship between $d_k$ and $V_{slicerIn,k}$ is illustrated in Eqn. 3. Thus, if $V_{slicerIn,k} \geq 0$, the third term is $+V_r$ and if $V_{slicerIn,k} < 0$, the third term is $-V_r$. In other words, the threshold is zero.

$$d_k = \begin{cases} +1, & V_{slicerIn,k} \geq 0 \\ -1, & V_{slicerIn,k} < 0 \end{cases} \quad (3)$$

Mathematically and practically, a goal of the regression is to reduce and/or minimize the difference between $V_{slicerIn,k}$ and $d_k V_r$ (i.e., error, $e_k$) through selection of equalization coefficients, $c_m$ and $x_i$, and the gain factor, G. The minimum error corresponds to an input to the DFE data slicer (i.e., output of the gain, feedforward equalization and decision feedback equalization) that is at or near $d_k V_r$. In other words, when the error is at or near a minimum, the equalization has accounted for at least some of the non-ideal channel characteristics.

Mathematically, the cost function, $e_k^2$, may be minimized by generating a gradient of the cost function as a function of $GV_{ink-m}$ (m=0, 1, 2) and $d_{k-i}$ (i=1, 2, . . . , N) as illustrated by Eqn. 4.

$$\nabla e_k^2 = 2e_k[GV_{in,k}, GV_{in,k-1}, GV_{ink-2}, d_{k-1}, d_{k-2}, \ldots, d_{k-N}] \quad (4)$$

A gradient descent technique may then be utilized to determine the DFE coefficient values. The gradient descent relation for the DFE coefficients, $x_i$ (i=1, 2, . . . , N), is illustrated in Eqn. 5.

$$x_i(n+1) = x_i(n) - \delta e_k d_{k-i} \quad (5)$$

where $\delta$ is a step size and n is iteration number. Thus, DFE coefficients (i.e., tap values) may be determined that minimize $e_k$ utilizing a gradient descent. The step size $\delta$ is related to a rate at which the gradient descent converges and to stability.

Some conventional techniques may utilize data slicer digital decisions, i.e., digital outputs, $d_{k-m}$, when determining, i.e., optimizing, FFE coefficients. One example conventional gradient descent relation for the FFE coefficients is illustrated in Eqn. 6:

$$c_m(n+1) = C_m(n) - \mu e_k d_{k-m} \quad (6)$$

Since the gradient descent of Eqn. 6 includes $d_{k-m}$, FFE adaptation using Eqn. 6 behaves similar to the DFE adaptation using Eqn. 5. In other words, after DFE coefficients have been determined, as described herein, FFE coefficients may not move significantly from their initial values when they are trained. Thus, adaptation of the FFE coefficients may be relatively limited using the conventional technique.

Referring again to Eqn. 1, it may be appreciated that the FFE term includes $GV_{in,k-m}$ multiplying an FFE coefficient, $c_m$. Thus, a gradient descent relation that includes $GV_{in,k-m}$ (i.e., a sample of the amplified received analog input) rather than $d_{k-m}$ may be written as Eqn. 7:

$$c_m(n+1) = c_m(n) - \mu e_k G V_{in,k-m} \quad (7)$$

In equation 7, $\mu$ is the step size and n is the iteration number. By utilizing a sign LMS technique, Eqn. 7 can be reduced to Eqn. 8 illustrated below.

$$c_m(n+1) = C_m(n) - \mu e_k b_{k-m} \quad (8)$$

where $$b_{k-m} = \text{sign}(GV_{in,k-m}) = \text{sign}(V_{in,k-m}) \quad (9)$$

In a physical system, Eqn. 9 may be implemented by an FFE data slicer module, as described herein. An FFE data slicer module is configured to receive and capture amplified analog input samples, $GV_{in,k-m}$, to determine whether each captured analog input sample is greater than, less than or equal to zero, and to provide as output the input signal digital decision, $b_{k-m}$. Each iteration of Eqn. 9, $b_{k-m}$ corresponds to a digital decision made based, at least in part, on the sampled input voltage, $V_{in,k-m}$, rather than $V_{sliverIn,k-m}$ (output of the DFE and input to the DFE data and error slicers) as may be utilized in conventional equalization coefficient adaptations that utilize $d_{k-m}$ when determining the FFE coefficients, $c_m$.

Referring again to FIG. 1, during training, a training pattern y[M:1] may be applied to Tx 102 and serialized into bit sequence $y_k$, k=1, . . . , M. A corresponding analog data signal, y(t), may be transmitted and carried by channel 104 and an associated analog input signal $V_{in}(t)$ may be received by Rx 106, as described herein.

Training controller 120 and/or adaptation logic 126 may then be configured to train (i.e., adapt) DFE 114 to determine DFE coefficients that minimize a mean square error between $V_{slicerIn,k}$, the input to data and error slicers 118, 124, and $d_k V_r$, a reference voltage, utilizing Eqn. 5. FFE coefficients may be unchanged during DFE training. Training controller 120 and/or adaptation logic 126 may then train FFE 112 to determine FFE coefficients that minimize the mean square error utilizing Eqns. 8 and 9, and thus, $V_{in,k-m}$, the inputs to FFE 112.

In some embodiments, DFE training may be repeated following FFE training. Repeating the DFE training is configured to refine (i.e., update) the DFE tap values (i.e., DFE coefficients) after the FFE coefficients have been determined, as described herein.

FIG. 2 illustrates a functional block diagram of one example 200 of the adaptive SerDes receiver 106 of FIG. 1. The adaptive SerDes receiver 200 includes a gain stage 202, a plurality of delay blocks 204a, 204b, 204c, a plurality of multipliers 206a, 206b, 206c, a summing junction 208, a DFE logic 210, a DFE data and error slicer 212, a CDR 214, an N-bit data buffer 260 and a multiplexer (Mux) 261. In some embodiments, delay block 204b may be omitted and an output 205 of delay block 204a may be connected to an input of delay block 204c. The adaptive SerDes receiver 200 may further include adaptation logic 256. Adaptation logic 256 corresponds to adaptation logic 126 of FIG. 1. Adaptation logic 256 includes an automatic gain control (AGC) LMS module 220, a DFE LMS module 222, an FFE data slicer 224 and an FFE LMS module 226.

The adaptive SerDes receiver 200 may include training controller 250. Training controller 250 corresponds to training controller 120 of FIG. 1. Thus, training controller 250 may be configured to manage training operations, as described herein. In an embodiment, the adaptive SerDes receiver 200 may include processor 252 and memory 254. In these embodiments, the training controller 250 may be implemented as an application configured to execute on processor 252. In another embodiment, training controller 250 and/or adaptation logic 256 may be implemented in circuitry.

Amplifier 202 corresponds to gain stage 110, CDR 214 corresponds to CDR 116, DFE data and error slicer 212 corresponds to a combination of data slicer 118 and error slicer 124. Delay blocks 204a, 204b, 204c, multipliers 206a, 206b, 206c and summing junction 208 correspond to FFE 112. DFE logic 210 is related to DFE 114.

The adaptive SerDes receiver 200 is configured to receive the analog input signal, $V_{in}(t)$, from, e.g., transmitter 102, via channel 104. Gain stage 202 is configured to amplify the received analog input signal. An amount of amplification, i.e., gain, corresponds to a gain factor, G, that may be set and/or determined during training utilizing AGC LMS module 220. The gain factor, G, may be determined, based, at least in part, on an error signal, $e_k$, and a recovered data sample, $d_k$, output from DFE data and error slicer module 212. Thus, an output 203 of gain stage 202 corresponds to $GV_{in}(t)$. The gain factor, G, may be greater than or equal to one, thus, as used herein, "amplified" corresponds to a gain factor of greater than or equal to one. Multipliers 206a, 206b, 206c are configured to receive, i.e., sample, the amplified input signal ($GV_{in}(t)$) the amplified input signal delayed a time, D, and the amplified input signal delayed a time 2D. The un-delayed input signal sample, $V_{in,k}$, is termed a pre-cursor, the 2D delayed input signal sample, $V_{in,k-2}$, is termed a post-cursor and the D delayed input signal sample, $V_{in,k-1}$, corresponds to a main cursor. The time delay, D, is the period of each data symbol, normally called UI (unit interval).

The multipliers 206a, 206b, 206c are further configured to receive FFE coefficients, $c_0$, $c_1$, $c_2$, from FFE LMS module 226. The FFE coefficients, $c_0$, $c_1$, $c_2$ may be determined during training based, at least in part, on an error $e_k$, and based, at least in part, on a plurality of input signal digital decisions output from FFE data slicer 224, as described herein. Outputs from multipliers 206a, 206b, 206c are provided to summing junction 208 and the output 209 of the summing junction 208 is provided to DFE logic 210.

DFE logic 210 is configured to receive the output 209 of summing junction 208 and a plurality of DFE coefficients (i.e., DFE taps) from DFE LMS module 222. The DFE coefficients, $x_i$, i=1, 2, . . . , N, may be determined during training based, at least in part, on the error, $e_k$, and based, at least in part, on the output digital decisions, i.e., the recovered data bits, $d_{k-i}$ (i=1, 2, . . . , N). The output digital decisions may be stored in the N-bit data buffer 260 for provision to DFE logic 210. DFE logic 210 is configured to multiply each of a plurality of prior output digital decisions, output from DFE data and error slicer 212, by a respective DFE coefficient, to sum the resulting products and the received output from summing junction 208 (i.e., the FFE output). The output 211 of DFE logic 210 may then be provided to DFE data and error slicer module 212. Thus, the output 211 corresponds to $V_{slicerIn,k}$, a sample of the DFE output, as described herein.

DFE data and error slicer module 212 is configured to receive the output 211 of DFE logic 210, an output, i.e., clock, from CDR 214 and a reference voltage, $V_r$, corresponding to a mean-to-peak voltage amplitude. DFE data and error slicer module 212 is configured to capture a sample of the received analog signal 211 output from DFE logic 210 (i.e., DFE output). DFE data and error slicer module 212 is configured to provide as output an output digital decision, i.e., recovered digital data, $d_k$, and an error, $e_k$. The output digital decisions may then be provided to 1:M Mux 261 for deserializing and then output as d[M:1].

FFE data slicer 224 is configured to receive the amplified analog input signal, $GV_{in}(t)$, the amplified analog input signal delayed a time, D, and the amplified analog input signal delayed a time 2D. In other words, FFE data slicer 224 is configured to receive the main cursor, pre-cursor and a post-cursor that were provided to multipliers 206a, 206b, 206c. An amount of amplification, if any, corresponds to the gain factor, G. Thus, the amplified analog input signal may correspond to the analog input signal when the gain factor is one. FFE data slicer 224 is further configured to receive a clock signal from CDR 214 and to capture amplified analog input signal samples in response to the clock signal. FFE data slicer 224 is configured to threshold detect the captured amplified analog input signal samples and to provide input signal digital decisions, $b_k$, $b_{k-1}$, $b_{k-2}$, as output, as described herein. Thus, $b_k$, $b_{k-1}$, $b_{k-2}$ correspond to three sequential input signal digital decisions. $b_k$ and $b_{k-1}$, are adjacent in time and $b_{k-1}$ and $b_{k-2}$ are adjacent in time. In other words, $b_k$ and $b_{k-1}$ are separated in time by the delay, D, and $b_{k-1}$ and $b_{k-2}$ are separated in time by the delay, D. FFE LMS module 226 is configured to receive the input signal digital decisions from the FFE data slicer 224 and the error, $e_k$, from DFE data and error slicer 212 and to determine FFE coefficients $c_m$ (m=0, 1, 2) as described herein.

Output 211 of the DFE logic 210 that is the input to the DFE data and error slicer module 212 corresponds to $V_{slicedIn,k}$, as described herein. Thus, output 211 includes contributions from both feedforward equalization and decision feedback equalization. The input 211 to the DFE data and error slicer module 212 is sampled by the DFE data and error slicer module 212 according to the clock signal from CDR 214. The DFE data and error slicer module 212 is configured to determine the digital output, $d_k$, for each sample, k, according to Eqn. 3. In other words, the digital output, $d_k$, is +1 when the input 211 to the DFE data and error slicer module 212 is greater than or equal to zero or is −1 when the input 211 is less than zero.

Training controller 250 is configured to manage training operation of adaptation logic 256. The training is configured to determine gain factor, G, DFE coefficients, $x_1$ (i=1, 2, . . . , N) and FFE coefficients $c_0$, $c_1$, $c_2$. Processor 252 is configured to perform operations of training controller 250 and adaptation logic 256. In some embodiments, processor 252 may include a vector processor configured to perform a plurality of operations in parallel. Memory 254 may store training data, e.g., current digital output, $d_k$, prior digital outputs, $d_{k-i}$ (i=N), $e_k$, input signal digital decisions, $b_{k-m}$ (m=0, 1, 2), gradient descent parameters δ, μ, and gradient decent coefficient values $x_i(n)$, $x_i(n+1)$, $c_m(n)$, and $c_m(n+1)$, (i=1, 2, . . . , N, m=0, 1, 2).

During training, a training analog input $V_{in}(t)$ may be received by gain stage 202. Training is configured to reduce the error, $e_k$, between $V_{slicerIn,k}$ and $d_k V_r$ by determining the equalization coefficients, $c_m$ and $x_i$(i=1, 2, . . . , N, m=0, 1, 2), and the gain factor, G, that minimize $e_k$. A gradient descent technique may be utilized to iteratively determine the DFE coefficient values and the FFE coefficient values.

DFE coefficients may be determined utilizing DFE LMS module 222. DFE LMS module 222 is configured to receive $d_k$ and $e_k$ from DFE data and error slicer 212. DFE LMS module 222 is further configured to implement Eqn. 5, iteratively, to determine DFE coefficients $x_i$, (i=1, 2, . . . , N) that minimize $e_k$.

Initially, e.g., at the beginning of the iterations, n=0 (i.e., n corresponds to iteration number), each $x_i(n=0)$, i=1, 2, . . . , N, may be set to an initial value, e.g., zero. N sequential digital output values (i.e., prior digital output values) may be acquired and stored to, e.g., memory 254. The error, $e_k$, and a digital output, $d_k$ (i.e., current digital output), may then be acquired from DFE data and error slicer 212. $x_i(n+1)$ may then be determined for each i=1, 2, . . . , N utilizing $x_i(n=0)$, $e_k$, appropriate prior output digital decision, i.e., prior digital output, $d_{k-i}$, and gradient descent coefficient, δ. $x_i(n+2)$ may similarly be determined for each i=1, . . . , N utilizing $x_i(n+1)$, $e_{k-1}$, prior decisions $d_{k+1-i}$, and gradient descent coefficient, δ. The operations may be repeated until $x_i(n+1)$ converges, i.e., $x_i(n+1)$ no longer moves and oscillates between two values as the iteration continue, i=1, . . . , N. The $d_{k-i}$ (i=1, 2, . . . , N) digital output values may be stored to an N-bit shift register. The oldest digital output value, $d_{k-(n+1)}$, may then be discarded when a new $d_k$ is acquired. Thus, DFE LMS module 222 and/or training controller 250 may be configured to maintain a sliding window of digital output values, $d_k$, $d_{k-i}$ (i=1, 2, . . . , N) to support gradient descent operations.

Thus, N DFE coefficients may be determined, iteratively, utilizing a gradient descent technique to minimize error, $e_k$. In an embodiment, $x_i(n+1)$ may be determined utilizing a hardware description language (HDL). In another embodiment, $x_i(n+1)$ may be determined utilizing circuitry designed based, at least in part, on an HDL implementation. In another embodiment, $x_i(n+1)$ may be determined utilizing a vector processor configured to determine N or a subset of N $x_i(n+1)$ values in parallel.

FFE data slicer module 224 is configured to implement Eqn. 9. FFE data slicer module 224 is configured to capture amplified analog input samples, as described herein, to threshold detect each analog input sample and to provide as output the input signal digital decision, $b_{k-m}$ (m=0, 1, 2). Each input signal digital decision, $b_{k-m}$, may be stored to memory 254 and/or provided to FFE LMS module 226. Thus, for each sample index, k, $b_{k-m}$, corresponds to a digital decision made based, at least in part, on the sampled input voltage, $V_{in,k-m}$, where m=0, 1, 2. This technique differs from conventional FFE coefficient adaptations that utilize, $d_{k-m}$ rather than $V_{in,k-m}$ when determining the FFE coefficients, $c_m$. In other words, $b_{k-m}$ corresponds to an input signal digital decision and $d_{k-m}$ corresponds to an output digital decision. Thus, $d_{k-m}$ includes contributions from both the FFE and the DFE.

FFE coefficients may be determined utilizing FFE LMS module 226. FFE LMS module 226 is configured to receive the error, $e_k$, from DFE data and error slicer 212. FFE LMS module 226 is further configured to receive the input signal digital decisions, $b_{k-m}$ (m=0, 1, 2), from FFE data slicer 224. FFE LMS module 226 is configured to implement Eqn. 8, iteratively, to determine FFE coefficients, $c_m$ (m=0, 1, 2) that minimize the error, $e_k$.

Initially, e.g., n=0, each $c_m(n=0)$ (m=0, 1, 2) may be set to an initial value. For example the initial values of $c_0$, $c_1$, $c_2$ may be −0.3, 1, −0.1, respectively. Each of the three input signal digital decisions, $b_k$, $b_{k-1}$, $b_{k-2}$, may be acquired from FFE data slicer 224. The error $e_k$, may then be acquired from DFE data and error slicer 212. $c_m(n+1)$ may then be determined for each m=0, 1, 2, utilizing $c_m(n=0)$, $e_k$, appropriate FFE data slicer 224 output, i.e., appropriate input signal digital decision, $b_{k-m}$, and gradient descent coefficient μ. $c_m(n+2)$ may be similarly determined for each m=0, 1, 2 utilizing $c_m(n+1)$, $e_{k+1}$, input signal digital decisions $b_{k+1-m}$, and gradient descent coefficient, μ. The operations may be repeated until $c_m(n+1)$ converges, i.e., $c_m(n+1)$ no longer moves and oscillates between two values as the iteration continues, m=0, 1, 2. A rate at which $c_m(n+1)$ converges may be related to a value of the gradient descent coefficient, μ. The values of μ, and δ represent a granularity of the equalization. In other words, a relatively smaller μ and δ correspond to relatively finer equalization steps while relatively larger μ and δ correspond to relatively coarser equalization steps. μ and δ may be on the order of millivolts (mV). For example, μ may be 15 mV and δ may be 4 mV.

The input signal digital decisions, $b_{k-m}$(m=0, 1, 2), may be stored to, e.g., memory 254 in an array (i.e., vector). Each newly acquired input signal digital decision, $b_k$, may then be stored to the array and the oldest, i.e., $b_{k-3}$, may then be discarded. Thus, FFE LMS module 226 and/or training controller 250 may be configured to maintain a sliding window of FFE data slicer 224 input signal digital decision values, $b_{k-m}$(m=0, 1, 2) to support gradient descent operations. Thus, the three FFE coefficients ($c_m$, m=0, 1, 2) may be determined iteratively, utilizing a gradient descent technique to minimize error $e_k$. In an embodiment, the gradient descent technique may be implemented by using a hardware description language, as described herein. In some embodiments, $c_m(n+1)$ may be determined utilizing a vector processor, as described herein.

Thus, during training, DFE LMS module 222 is configured to implement Eqn. 5 in order to determine DFE coefficients, i.e., adapt a DFE to a channel, e.g., channel 104, coupled to amplifier 202. After the DFE coefficients have been determined, FFE LMS module 226 is configured to implement Eqn. 8 in order to determine FFE coefficients to adapt the corresponding FFE to the channel 104. In some embodiments, DFE LMS module 222 may repeat determining the DFE coefficients (i.e., adapting the DFE) after the FFE coefficients have been determined (i.e., the FFE has been adapted). Repeating the adapting is configured to fine tune the DFE coefficient values utilizing the determined FFE coefficients, determined as described herein. AGC LMS module 220 is similarly configured to determine the gain of amplifier 202 to adjust the amplitude of the input signal $V_{in}(t)$ to correspond to a voltage range related to $V_r$.

Following determination of the DFE coefficients and the FFE coefficients, i.e., after completing training, adaptive SerDes Rx 200 may be configured to enter tracking mode. For example, the DFE coefficients may be stored to DFE logic 210 for utilization during tracking. In another example, the DFE coefficients may be stored to memory 254 and/or DFE LMS module 222. In this example, memory 254 and/or DFE LMS module 222 may be configured to provide the tap values (i.e., DFE coefficients) 223 to DFE logic 210.

Similarly, the FFE coefficients may be stored to memory 254 and/or FFE LMS module 226. Memory 254 and/or FFE LMS module 226 may be configured to provide the FFE coefficients to multipliers 206a, 206b, 206c.

Thus, equalization coefficients determined during training mode may then be utilized for tracking mode. The DFE coefficients may be determined based, at least in part, on digital output, i.e., output digital decision, $d_k$. The FFE coefficients may be similarly determined based, at least in part, on an input signal digital decision, $b_{k-m}$, related to the input voltage $V_{in,k-m}$.

FIG. 3A is a flowchart 300 of adaptive SerDes receiver training operations according to various embodiments of the present disclosure. In particular, the flowchart 300 illustrates an adaptive equalization flow of a SerDes receiver to a communications channel. The operations may be performed, for example, by training controller 120 and adaptation logic 126 of FIG. 1 and/or training controller 250 and adaptation logic 256 of FIG. 2.

Operations of this embodiment may begin with start 302. It is assumed that, prior to start, a training input has been received. Operation 304 includes training a decision feedback equalizer (DFE). For example, DFE coefficients may be determined using a gradient descent technique based, at least in part, on error, $e_k$, digital output $d_k$ and prior digital outputs, $d_{k-1}$, i=1, 2, . . . , N. A feedforward equalizer (FFE) may be trained at operation 306. For example, FFE coefficients may be determined using a gradient descent technique based, at least in part, on the error $e_k$ and the digital decisions $(b_{k-m}, m=0, 1, 2)$ related to the received input voltage. In some embodiments, DFE coefficients may be fine-tuned at operation 308. In other words, DFE coefficients may be updated after the FFE coefficients have been determined. Program flow may then continue at operation 310.

Thus, DFE and FFE coefficients may be determined in a training mode and the corresponding DFE and FFE adapted to a communication channel.

FIG. 3B is a flowchart 320 of DFE coefficient training operations according to various embodiments of the present disclosure. In particular, the flowchart 320 illustrates determining DFE coefficients. The operations of flowchart 320 correspond to operation 304 and/or operation 308 of FIG. 3A. The operations may be performed, for example, by training controller 120 and adaptation logic 126 of FIG. 1 and/or training controller 250 and adaptation logic 256, including DFE LMS module 222, of FIG. 2.

A plurality of sequential prior digital output values may be determined at operation 322. A current digital output value may be determined at operation 324. An error, $e_k$, may be determined at operation 326. For example, the error may be determined based, at least in part, on the prior digital output values and based, at least in part, on a current digital output value and a reference. The plurality of DFE coefficients may be determined at operation 328. For example, the plurality of DFE coefficients may be determined utilizing a gradient descent technique, as described herein. The plurality of DFE coefficients may be stored at operation 330. Program flow may continue at operation 332. Thus, a plurality of DFE coefficients, configured to minimize the error $e_k$, may be determined.

FIG. 3C is a flowchart 350 of FFE coefficient training operations according to various embodiments of the present disclosure. In particular, the flowchart 350 illustrates determining FFE coefficients. The operations of flowchart 350 correspond to operation 306 of FIG. 3A. The operations may be performed, for example, by training controller 120 and adaptation logic 126 of FIG. 1 and/or training controller 250 and adaptation logic 256, including FFE LMS module 226, of FIG. 2.

A plurality of sequential prior digital output values ($d_{k-i}$, i=1, . . . , N) may be determined at operation 352. A current digital output value ($d_k$) may be determined at operation 354. An error, $e_k$, may be determined at operation 356. For example, the error may be determined based, at least in part, on the prior digital output values and based, at least in part, on a current digital output value and a reference. A number of, e.g., three, input signal digital decisions ($b_{k-m}$, m=0, 1, 2) may be determined at operation 358. Three FFE coefficients ($c_m$, m=0, 1, 2) may be determined at operation 360. For example, the plurality of FFE coefficients may be determined utilizing a gradient descent technique, as described herein. The FFE coefficients may be stored at operation 362. Program flow may then continue at operation 364. Thus, three FFE coefficients, configured to minimize the error $e_k$, may be determined.

FIGS. 4 through 7 illustrate simulation results corresponding to a model of a 10 GHz adaptive SerDes receiver, simulated using Simulink® modeling software available from MathWorks®, Natick, Mass. The training sequence simulated included first training the DFE then training the FFE and then fine-tuning the DFE, as described herein.

FIG. 4 is a plot 400 of decision feedback equalizer tap value simulation results for one example adaptive SerDes receiver model. The plot 400 illustrates two DFE coefficient values, $x_1$ 402 and $x_2$ 404, from an initial value of zero to their respective converged values utilizing the gradient descent technique, as described herein. A horizontal axis is time in units of $10^{-5}$ seconds and a vertical axis corresponds to DFE coefficient values at each iteration of the gradient descent. Plot 400 includes three regions 410, 412, 414. The first region 410 corresponds to DFE training prior to FFE training, the second region 412 is the FFE training interval and the third region 414 corresponds to fine-tuning the DFE coefficients determined during the first training region 410. A duration of the first region 410 is about 12 (microseconds). A duration of the second region 412 is about 7 The fine-tuned DFE coefficients converge from their respective initial values at the start of the third region to their final converged values in less than 5 µs.

Figure 5:
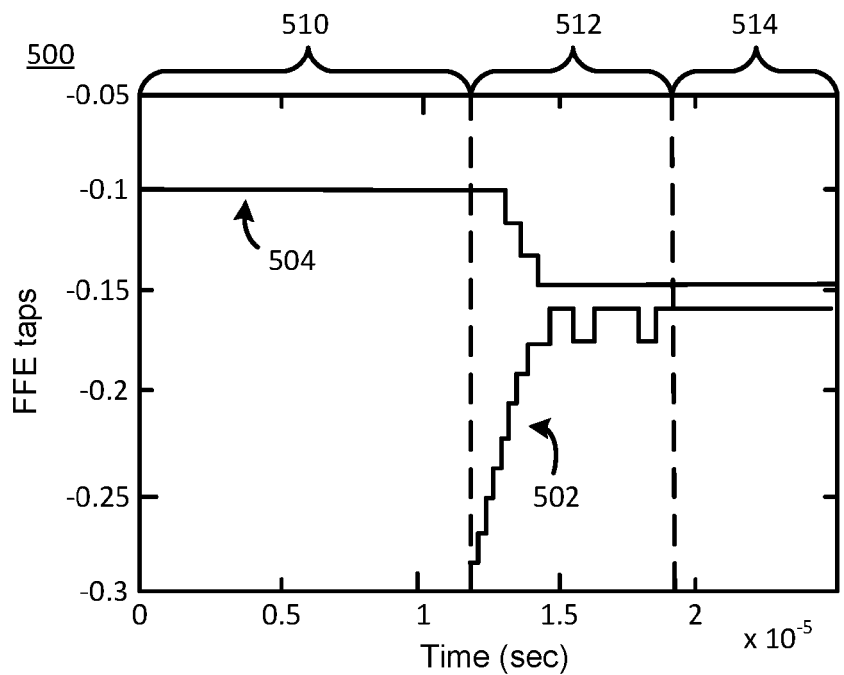
FIG. 5 is a plot of feed forward equalizer coefficient value simulation results for the example adaptive SerDes receiver model of FIG. 4.

FIG. 5 is a plot 500 of feed forward equalizer coefficient value simulation results for the example adaptive SerDes receiver model of FIG. 4. Plot 500 illustrates training of FFE coefficients, utilizing an input signal digital decision output from an FFE data slicer, e.g., FFE data slicer 224 of FIG. 2. Similar to plot 400, the vertical axis corresponds to FFE coefficient values at each iteration of the gradient descent. Similar to plot 400, plot 500 includes three regions 510, 512, 514. The first region 510 is the first DFE training interval prior to FFE training, the second region 512 corresponds to FFE training and the third region 514 corresponds the DFE fine-tuning interval. The durations of each of the three regions 510, 512, 514 corresponds to the respective durations of the three regions 410, 412, 414 of FIG. 4.

Plot 500 includes two waveforms 502, 504, illustrating a precursor, $c_0$ 502, and a post-cursor, $c_2$ 504, i.e., FFE coefficient values, during training. The main cursor (i.e., FFE coefficient $c_1$) is not included in the simulation results since the FFE coefficient $c_1$ is equivalent to a gain factor. Initially, the FFE coefficient values, $c_0$ and $c_2$, are −0.3 and −0.1, respectively. During training, $c_0$ increases to a converged value of slightly less than −0.15 and $c_1$ decreases to a converged value of slightly more than −0.15. Thus, region 512 illustrates convergence of FFE coefficient values during simulated FFE training utilizing the FFE data slicer output, as described herein.

Figure 6:
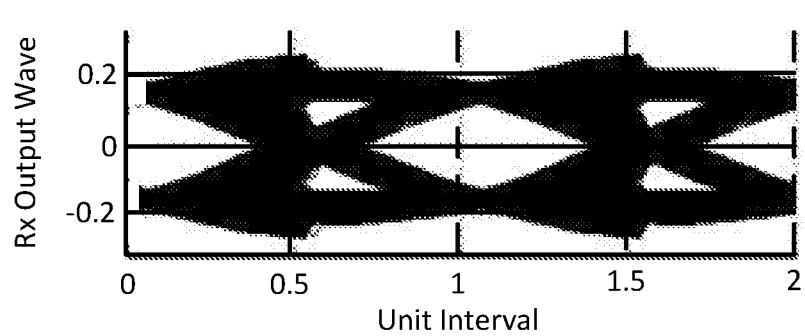
FIG. 6 is a plot of an eye diagram simulation results for the example adaptive SerDes receiver model of FIGS. 4 and 5.

FIG. 6 is a plot 600 of an eye diagram simulation results for the example adaptive SerDes receiver model of FIGS. 4 and 5. Plot 600 includes an eye diagram for the example adaptive SerDes receiver model trained as illustrated in FIGS. 4 and 5. Eye height is 0.226 volts, representing a 12.4% improvement compared to simulated conventional training utilizing the digital output for training the FFE coefficients. Eye width illustrates a 42.8% improvement compared to simulated conventional training.

Figure 7:
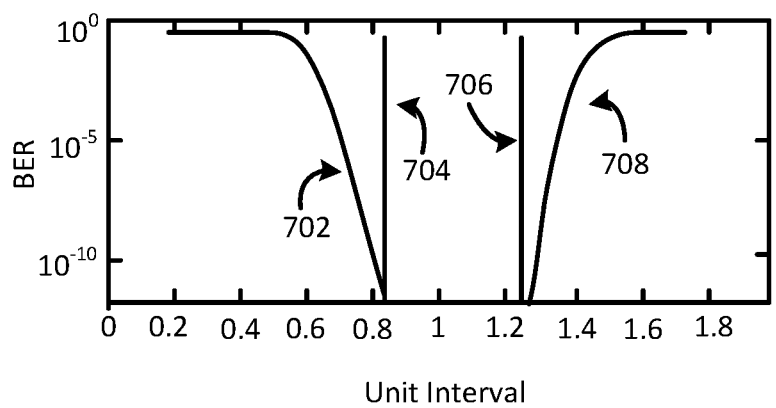
FIG. 7 is a plot of bit error rate (BER) simulation results illustrating a bathtub curve for an adaptive SerDes receiver model of FIGS. 4 and 5.

FIG. 7 is a plot 700 of bit error rate (BER) simulation results illustrating a bathtub curve for the example adaptive SerDes receiver model of FIGS. 4 and 5. Plot 700 includes a bathtub curve for the adaptive SerDes receiver model trained as illustrated in FIGS. 4 and 5. Horizontal eye width is 0.400 UI (unit intervals) at a $1 \times 10^{-12}$ BER.

While the flowcharts of FIGS. 3A through 3C illustrate operations according various embodiments, it is to be understood that not all of the operations depicted in FIGS. 3A through 3C are necessary for other embodiments. In addition, it is fully contemplated herein that in other embodiments of the present disclosure, the operations depicted in FIGS. 3A, 3B and/or 3C and/or other operations described herein may be combined in a manner not specifically shown in any of the drawings, and such embodiments may include less or more operations than are illustrated in FIGS. 3A through 3C. Thus, claims directed to features and/or operations that are not exactly shown in one drawing are deemed within the scope and content of the present disclosure.

Thus, an apparatus, method and system are configured to determine a plurality of DFE coefficients and a plurality of FFE coefficients utilizing an LMS technique. The apparatus, method and system are configured to implement a gradient descent technique to iteratively minimize the LMS error and, thus, to determine the equalization coefficients. The gradient descent operations related to determining the FFE coefficients utilize an output of an FFE data slicer. The output of the FFE data slicer corresponds to a sample of an amplified received analog input signal. Utilizing the sampled analog input signal to determine the FFE coefficients may facilitate relatively better adaptation of the FFE coefficients compared to techniques that utilize the output of the DFE slicer for determining both DFE coefficients and FFE coefficients.

The DFE coefficients and FFE coefficients may be determined during training operations when a training input signal including a training bit sequence is input to the channel coupled to the adaptive SerDes receiver. The determined DFE and FFE coefficients may then be utilized during tracking operations of the adaptive SerDes receiver to mitigate non-ideal channel characteristics and, thus, reduce a bit error rate associated with recovering digital data from a received analog information signal.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any embodiment herein, the term "module" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

Channel 104 may be included in a packet switched network. Tx 102 and Rx 106, e.g., Rx 200, may be capable of communicating with each other using a selected packet switched network communications protocol. One example communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December, 2008 and/or later versions of this standard. Alternatively or additionally, Tx 102 and Rx 106, e.g., Rx 200, may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, Tx 102 and Rx 106, e.g., Rx 200, may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, Tx 102 and Rx 106, e.g., Rx 200, may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Tx 102 and Rx 106, e.g., Rx 200, may comply and/or be compatible with one or more third generation (3G) telecommunication standards, recommendations and/or protocols that may comply and/or be compatible with International Telecommunication Union (ITU) Improved Mobile Telephone Communications (IMT)-2000 family of standards released beginning in 1992, and/or later and/or related releases of these standards. For example, Tx 102 and Rx 106, e.g., Rx 200, may comply and/or be compatible with one or more CDMA (Code Division Multiple Access) 2000 standard(s) and/or later and/or related versions of these standards including, for example, CDMA2000 1×RTT, 1× Advanced and/or CDMA2000 1×EV-DO (Evolution-Data Optimized): Release 0, Revision A, Revision B, Ultra Mobile Broadband (UMB). In another example, Tx 102 and Rx 106, e.g., Rx 200, may comply and/or be compatible with UMTS (Universal Mobile Telecommunication System) standard and/or later and/or related versions of these standards.

Tx 102 and Rx 106, e.g., Rx 200, may comply and/or be compatible with one or more fourth generation (4G) telecommunication standards, recommendations and/or protocols that may comply and/or be compatible with ITU IMT-Advanced family of standards released beginning in March 2008, and/or later and/or related releases of these standards. For example, Tx 102 and Rx 106, e.g., Rx 200, may comply and/or be compatible with IEEE standard: IEEE Std 802.16™-2012, title: IEEE Standard for Air Interface for Broadband Wireless Access Systems, released August 2012, and/or related and/or later versions of this standard. In another example, Tx 102 and Rx 106, e.g., Rx 200, may comply and/or be compatible with Long Term Evolution (LTE), Release 8, released March 2011, by the Third Generation Partnership Project (3GPP) and/or later and/or related versions of these standards, specifications and releases, for example, LTE-Advanced, Release 10, released April 2011.

Memory 254 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

In some embodiments, a hardware description language (HDL) may be used to specify circuit, module and/or logic implementation(s) for the various logic, modules and/or circuitry described herein. For example, in one embodiment the hardware description language may comply or be compatible with a very high speed integrated circuits (VHSIC) hardware description language (VHDL) that may enable semiconductor fabrication of one or more circuits, modules and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

In some embodiments, a Verilog hardware description language (HDL) may be used to specify circuit and/or logic implementation(s) for the various logic and/or circuitry described herein. For example, in one embodiment, the Verilog HDL may comply or be compatible with IEEE standard 62530-2011: SystemVerilog—Unified Hardware Design, Specification, and Verification Language, dated Jul. 7, 2011; IEEE Std 1800-2012: IEEE Standard for SystemVerilog-Unified Hardware Design, Specification, and Verification Language, released Feb. 21, 2013; IEEE standard 1364-2005: IEEE Standard for Verilog Hardware Description Language, dated Apr. 18, 2006 and/or other versions of Verilog HDL and/or SystemVerilog standards.

Thus, an apparatus, method and system are configured to determine a plurality of DFE coefficients and a plurality of FFE coefficients utilizing an LMS technique. The apparatus, method and system are configured to implement a gradient descent technique to iteratively minimize the LMS error and, thus, to determine the equalization coefficients.

The gradient descent technique related to determining the DFE coefficients utilizes an output of a DFE data slicer. The gradient descent technique related to determining the FFE coefficients utilize an output of an FFE data slicer. The output of the DFE data slicer corresponds to a symbol decision, i.e., a digital output of the adaptive SerDes receiver. The output of the FFE data slicer corresponds to a sample of an amplified received analog input signal. Utilizing the sampled received analog input signal to determine the FFE coefficients may facilitate relatively better adaptation of the FFE coefficients compared to techniques that utilize the output of the DFE slicer for both DFE and FFE The DFE coefficients and FFE coefficients may be determined during training operations when a training input signal including a training bit sequence is input to the channel coupled to the adaptive SerDes receiver. The determined DFE and FFE coefficients may then be utilized during tracking operations of the adaptive SerDes receiver to mitigate non-ideal channel characteristics and, thus, reduce a bit error rate associated with recovering digital data from a received analog information signal.

Examples

Examples of the present disclosure include subject material such as a method, means for performing acts of the method, a device, or of an apparatus or system related to an adaptive SerDes (serializer/deserializer) receiver, as discussed below.

Example 1

According to this example there is provided an apparatus. The apparatus includes a feedforward equalizer (FFE), an FFE data slicer and an FFE least mean square (LMS) module. The FFE data slicer is to threshold detect a sample of a received analog training signal, a result of the threshold detecting corresponding to an input signal digital decision. The FFE LMS module is to determine a plurality of FFE coefficients based, at least in part, on an output of the FFE data slicer and based, at least in part, on a mean square error corresponding to a difference between an equalized sample and a reference.

Example 2

This example includes the element of example 1, wherein the output of the FFE data slicer includes three sequential input signal digital decisions, adjacent in time input signal digital decisions separated in time by a delay, D, the FFE LMS module to determine three FFE coefficients based, at least in part, on the three sequential input signal digital decisions.

Example 3

This example includes the element of example 1, wherein the FFE includes a plurality of delay blocks, three multipliers and a summing junction, each multiplier to receive a respective FFE coefficient and a respective sample of the received analog training signal.

Example 4

This example includes the elements according to any one of examples 1 to 3, wherein each of the plurality of FFE coefficients is determined using a gradient descent technique.

Example 5

This example includes the elements according to any one of examples 1 to 3, wherein the FFE is to equalize a received analog data signal utilizing the plurality of FFE coefficients.

Example 6

This example includes the element of example 5, wherein the equalizing is to mitigate effects of non-ideal channel characteristics and to facilitate recovery of transmitted data from the received analog data signal.

Example 7

This example includes the elements according to any one of examples 1 to 3, further including a decision feedback equalizer (DFE) coupled to an output of the FFE and a DFE data slicer to threshold detect a sample of an output of the DFE, a result of the detecting corresponding to a digital output.

Example 8

This example includes the element of example 7, further including a DFE LMS module to determine a plurality of DFE coefficients based, at least in part, on the mean square error and based, at least in part, on the plurality of prior digital outputs.

Example 9

This example includes the elements according to any one of examples 1 to 3, further including a training controller to manage training operations.

Example 10

This example includes the elements according to any one of examples 1 to 3, wherein the FFE LMS module is implemented in circuitry.

Example 11

According to this example there is provided a method. The method includes threshold detecting, by a feedforward equalizer (FFE) data slicer, a sample of a received analog training signal, a result of the threshold detecting corresponding to an input signal digital decision, the received analog training signal input to an FFE. The method further includes determining, by an FFE least mean square (LMS) module, a plurality of FFE coefficients based, at least in part, on an output of the FFE data slicer and based, at least in part, on a mean square error corresponding to a difference between an equalized sample and a reference.

Example 12

This example includes the element of example 11, further including determining, by the FFE LMS module, three FFE coefficients based, at least in part, on three sequential input signal digital decisions, the output of the FFE data slicer including the three sequential input signal digital decisions, adjacent in time input signal digital decisions separated in time by a delay, D.

Example 13

This example includes the element of example 11, further including threshold detecting, by a DFE data slicer, a sample of an output of a decision feedback equalizer (DFE), the DFE coupled to an output of the FFE, a result of the detecting corresponding to a digital output.

Example 14

This example includes the element of example 13, further including determining, by a DFE LMS module, a plurality of DFE coefficients based, at least in part, on the mean square error and based, at least in part, on the plurality of prior digital outputs.

Example 15

This example includes the element of example 11, wherein the FFE includes a plurality of delay blocks, three multipliers and a summing junction, further including receiving, by each multiplier, a respective FFE coefficient and a respective sample of the received analog training signal.

Example 16

This example includes the element of example 11, wherein each of the plurality of FFE coefficients is determined using a gradient descent technique.

Example 17

This example includes the element of example 14, wherein the plurality of FFE coefficients are determined after the plurality of DFE coefficients are determined.

Example 18

This example includes the element of example 17, wherein each of the plurality of DFE coefficients is updated after determining the plurality of FFE coefficients.

Example 19

This example includes the element of example 11, further including equalizing, by an FFE, a received data signal using the plurality of FFE coefficients.

Example 20

This example includes the element of example 19, wherein the equalizing is to mitigate effects of non-ideal channel characteristics and to facilitate recovery of transmitted data from the received analog data signal.

Example 21

This example includes the element of example 19, further including, equalizing by a DFE, an output of the FFE.

Example 22

This example includes the element of example 11, further including managing, by a training controller, training operations.

Example 23

This example includes the element of example 11, wherein the FFE LMS module is implemented in circuitry.

Example 24

According to this example there is provided a receiver. The receiver includes a feedforward equalizer (FFE), a decision feedback equalizer (DFE) coupled to an output of the FFE, a DFE data slicer coupled to an output of the DFE, and adaptation logic. The adaptation logic includes an FFE data slicer to threshold detect a sample of a received analog training signal, a result of the threshold detecting corresponding to an input signal digital decision, and an FFE least mean square (LMS) module to determine a plurality of FFE coefficients based, at least in part, on an output of the FFE data slicer and based, at least in part, on a mean square error corresponding to a difference between an equalized sample and a reference.

Example 25

This example includes the element of example 24, wherein the output of the FFE data slicer includes three sequential input signal digital decisions, adjacent in time input signal digital decisions separated in time by a delay, D, the FFE LMS module to determine three FFE coefficients based, at least in part, on the three sequential input signal digital decisions.

Example 26

This example includes the element of example 24, wherein the DFE data slicer is to threshold detect a sample of an output of the DFE, a result of the detecting corresponding to a digital output.

Example 27

This example includes the receiver according to any one of examples 24 to 26, wherein the adaptation logic further includes a DFE LMS module to determine a plurality of DFE coefficients based, at least in part, on the mean square error and based, at least in part, on the plurality of prior digital outputs.

Example 28

This example includes the receiver according to any one of examples 24 to 26, wherein the FFE includes a plurality of delay blocks, three multipliers and a summing junction, each multiplier to receive a respective FFE coefficient and a respective sample of the received analog training signal.

Example 29

This example includes the receiver according to any one of examples 24 to 26, wherein each of the plurality of FFE coefficients is determined using a gradient descent technique.

Example 30

This example includes the element of example 27, wherein the plurality of FFE coefficients are determined after the plurality of DFE coefficients are determined.

Example 31

This example includes the element of example 30, wherein each of the plurality of DFE coefficients is updated after determining the plurality of FFE coefficients.

Example 32

This example includes the receiver according to any one of examples 24 to 26, wherein the FFE is to equalize a received analog data signal utilizing the plurality of FFE coefficients.

Example 33

This example includes the element of example 32, wherein the equalizing is to mitigate effects of non-ideal channel characteristics and to facilitate recovery of transmitted data from the received analog data signal.

Example 34

This example includes the element of example 32, wherein the DFE is to equalize an output signal from the FFE.

Example 35

This example includes the receiver according to any one of examples 24 to 26, further including a training controller to manage training operations.

Example 36

This example includes the receiver according to any one of examples 24 to 26, wherein the FFE LMS module is implemented in circuitry.

Example 37

A system including at least one device arranged to perform the method of any one of examples 11 to 23.

Example 38

A device including means to perform the method of any one of examples 11 to 23.

Example 39

A computer readable storage device having stored thereon instructions that when executed by one or more processors result in the following operations including: the method according to any one of examples 11 through 23.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An apparatus comprising:
   a feedforward equalizer (FFE);
   an FFE data slicer to threshold detect a sample of a received analog training signal, a result of the threshold detecting corresponding to an input signal digital decision; and
   FFE least mean square (LMS) circuitry to determine a plurality of FFE coefficients based, at least in part, on an output of the FFE data slicer and based, at least in part, on a mean square error corresponding to a difference between an equalized sample and a reference;
   wherein the output of the FFE data slicer comprises three sequential input signal digital decisions separated in time by a delay, D, and the FFE LMS circuitry is to determine three FFE coefficients based, at least in part, on the three sequential input signal digital decisions.

2. The apparatus of claim 1, wherein the FFE comprises a plurality of delay blocks, three multipliers and a summing junction, each multiplier to receive a respective FFE coefficient and a respective sample of the received analog training signal.

3. The apparatus of claim 1, wherein each of the plurality of FFE coefficients is determined using a gradient descent technique.

4. The apparatus of claim 1, wherein the FFE is to equalize a received analog data signal utilizing the plurality of FFE coefficients.

5. A method comprising:
   threshold detecting, by a feedforward equalizer (FFE) data slicer, a sample of a received analog training signal, a result of the threshold detecting corresponding to an input signal digital decision, the received analog training signal input to an FFE;
   determining, by FFE least mean square (LMS) circuitry, a plurality of FFE coefficients based, at least in part, on an output of the FFE data slicer and based, at least in part, on a mean square error corresponding to a difference between an equalized sample and a reference; and
   determining, by the FFE LMS circuitry, three FFE coefficients based, at least in part, on three sequential input signal digital decisions, the output of the FFE data slicer comprising the three sequential input signal digital decisions, adjacent in time input signal digital decisions separated in time by a delay, D.

6. The method of claim 5, further comprising threshold detecting, by a DFE data slicer, a sample of an output of a decision feedback equalizer (DFE), the DFE coupled to an output of the FFE, a result of the detecting corresponding to a digital output.

7. The method of claim 6, further comprising:
   determining, by DFE LMS circuitry, a plurality of DFE coefficients based, at least in part, on the mean square error and based, at least in part, on a plurality of prior digital outputs.

8. The method of claim 5, wherein the FFE comprises a plurality of delay blocks, three multipliers and a summing junction, further comprising receiving, by each multiplier, a respective FFE coefficient and a respective sample of the received analog training signal.

9. The method of claim 5, wherein each of the plurality of FFE coefficients is determined using a gradient descent technique.

10. The method of claim 7, wherein the plurality of FFE coefficients are determined after the plurality of DFE coefficients are determined.

11. The method of claim 10, wherein each of the plurality of DFE coefficients is updated after determining the plurality of FFE coefficients.

12. The method of claim 5, further comprising equalizing, by an FFE, a received analog data signal using the plurality of FFE coefficients.

13. A receiver comprising:
   a feedforward equalizer (FFE);
   a decision feedback equalizer (DFE) coupled to an output of the FFE;
   a DFE data slicer coupled to an output of the DFE; and
   adaptation logic comprising:
     an FFE data slicer to threshold detect a sample of a received analog training signal, a result of the threshold detecting corresponding to an input signal digital decision, and
     FFE least mean square (LMS) circuitry to determine a plurality of FFE coefficients based, at least in part, on an output of the FFE data slicer and based, at least in part, on a mean square error corresponding to a difference between an equalized sample and a reference;

wherein the output of the FFE data slicer comprises three sequential input signal digital decisions separated in time by a delay, D, and the FFE LMS circuitry module is to determine three FFE coefficients based, at least in part, on the three sequential input signal digital decisions.

14. The receiver of claim 13, wherein the DFE data slicer is to threshold detect a sample of an output of the DFE, a result of the detecting corresponding to a digital output.

15. The receiver of claim 13, wherein the adaptation logic further comprises DFE LMS circuitry to determine a plurality of DFE coefficients based, at least in part, on the mean square error and based, at least in part, on a plurality of prior digital outputs.

16. The receiver of claim 13, wherein the FFE comprises a plurality of delay blocks, three multipliers and a summing junction, each multiplier to receive a respective FFE coefficient and a respective sample of the received analog training signal.

17. The receiver of claim 13, wherein each of the plurality of FFE coefficients is determined using a gradient descent technique.

18. The receiver of claim 15, wherein the plurality of FFE coefficients are determined after the plurality of DFE coefficients are determined.

19. The receiver of claim 18, wherein each of the plurality of DFE coefficients is updated after determining the plurality of FFE coefficients.

* * * * *